(12) United States Patent
Ohtsu et al.

(10) Patent No.: US 7,558,188 B2
(45) Date of Patent: Jul. 7, 2009

(54) MAGNETIC HEAD HAVING DURABILITY AGAINST STATIC ELECTRICITY WITH MODIFIED TIME CONSTANT

(75) Inventors: Takayoshi Ohtsu, Kanagawa (JP); Shoji Natori, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 342 days.

(21) Appl. No.: 11/291,014

(22) Filed: Nov. 29, 2005

(65) Prior Publication Data
US 2006/0132985 A1 Jun. 22, 2006

(30) Foreign Application Priority Data
Dec. 17, 2004 (JP) .............................. 2004-366052

(51) Int. Cl.
*G11B 5/127* (2006.01)

(52) U.S. Cl. ..................................... 369/323
(58) Field of Classification Search ................. 360/323
See application file for complete search history.

(56) References Cited

U.S. PATENT DOCUMENTS
6,870,706 B1 * 3/2005 Zhu ........................... 360/128

FOREIGN PATENT DOCUMENTS
| JP | 07-169005 | 7/1995 |
| JP | 10-055511 | 2/1998 |
| JP | 10-269534 | 10/1998 |

* cited by examiner

*Primary Examiner*—A. J. Heinz
(74) *Attorney, Agent, or Firm*—Townsend and Townsend and Crew LLP; Rambod Nader

(57) ABSTRACT

Embodiments of the invention provide a read head which is implemented in a magnetic disk drive that supports a high recording density and a high transfer rate and is excellent in static electricity durability. In one embodiment, a magnetic head wherein a charge diffuses from a read element to a slider at a time constant of about 100 ms or less.

15 Claims, 9 Drawing Sheets

(a)

(b)

MAGNETIC HEAD HAVING DURABILITY AGAINST STATIC ELECTRICITY WITH MODIFIED TIME CONSTANT

CROSS-REFERENCES TO RELATED APPLICATIONS

This application claims priority from Japanese Patent Application No. JP2004-366052, filed Dec. 17, 2004, the entire disclosure of which is incorporated herein by reference.

BACKGROUND OF THE INVENTION

The present invention relates to a magnetic head having improved durability against static electricity and higher reliability.

A spin valve element using the giant magnetoresistive effect has come into practical use as a read element of a magnetic disk drive. Read sensitivity has been improved along with improvements in recording density, with the result that damage caused by static electricity in the manufacture process gives rise to a problem. Waveform fluctuation and an increase in noise are generated by such damage in addition to electric breakdown and fusion of devices. This presents a major challenge from the standpoint of yields and reliability of magnetic heads. Hence, the following countermeasures have been taken against the damage by static electricity.

(1) A method for short-circuiting terminals is disclosed in Japanese Patent Laid-open No. 10-055511. In this disclosure, an MR lead is shunt by an MR head suspension, and means for opening a circuit before completion of assembly is used to take a measure for protection against the static electricity.

(2) A method for inserting a resistance between terminals is disclosed in Japanese Patent Laid-open No. 7-169005. In this disclosure, a discharge protection circuit is provided with a path for shunting a current to be applied to an MR head element.

(3) A method for inserting a diode between terminals is disclosed in Japanese Patent Laid-open No. 10-269534, in which a shot key diode is connected to a protection circuit.

BRIEF SUMMARY OF THE INVENTION

Although it is important to control an amount of a charge and a discharge time in a device susceptive to the static electricity, such as the GMR head (read element), any disclosure relating to such control has not been made. In order to further enhance durability against static electricity in the manufacture process, it is necessary also to improve control on the time the electric charge diffuses in addition to shunting between terminals and inserting a resistance or diode between terminals. When the charge diffuses in a short period of time, a large current is generated to damage the read element. In turn, when the charge diffuses for a long period of time, the charge is retained in a subsequent process to cause static electricity destruction. Hence, the present invention provides a read head which is implemented in a magnetic disk drive that supports a high recording density and a high transfer rate and is excellent in static electricity durability.

A magnetic head according to an embodiment of the present invention is characterized in that a charge diffuses from a read element to a slider at a time constant of about 100 ms or less. Further, the magnetic head is characterized in that a resistance value between an electrode and the slider is in the range of about $10^6$ Ω to $10^{11}$ Ω.

A head suspension assembly according to an embodiment of the present invention is characterized in that a charge diffuses from a read element to a suspension at a time constant of about 100 ms or less. Further, the head suspension assembly is characterized in that a resistance value between an electrode and the suspension is in the range of about $10^6$ Ω to $10^{11}$ Ω. The inventors have determined these ranges for the present invention. Some examples falling within the ranges are described hereinbelow.

According to the present invention, it is possible to improve static electricity durability and to realize a magnetic head which is high in yield and reliability.

DETAILED DESCRIPTION OF THE INVENTION

Hereinafter, embodiments of the present invention will be described with reference to the drawings.

Figure 1:
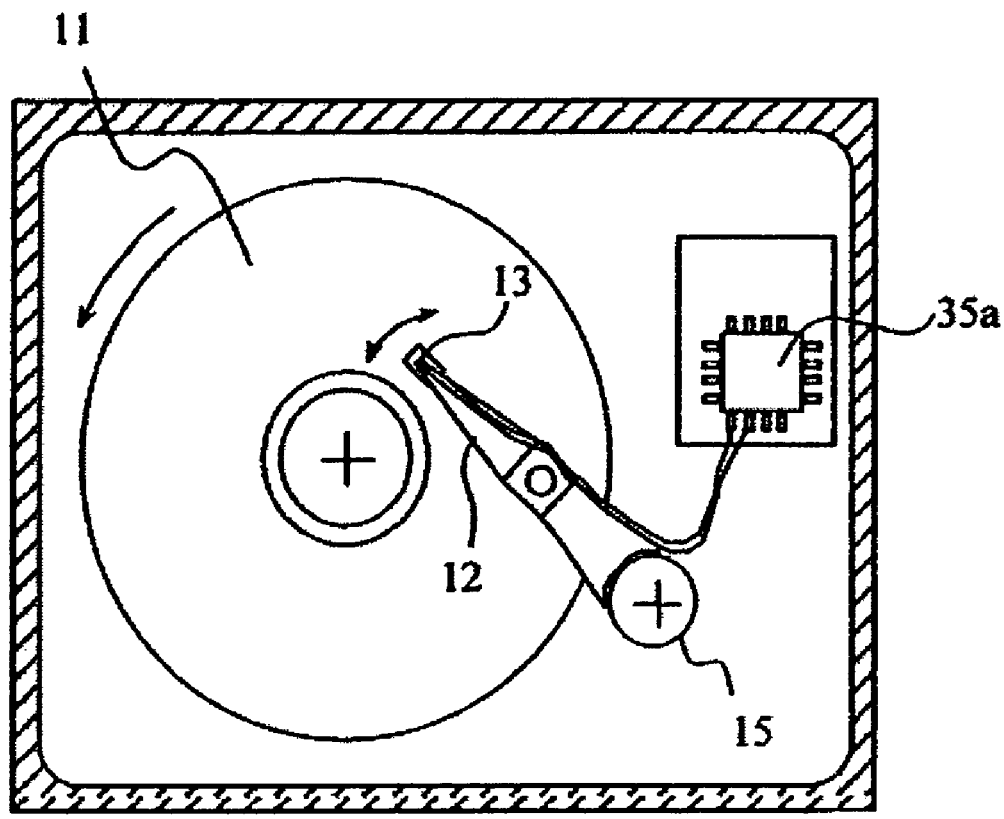
FIG. 1 is a top view and a side view showing a disk drive according to an embodiment of the present invention.
Figure 1:
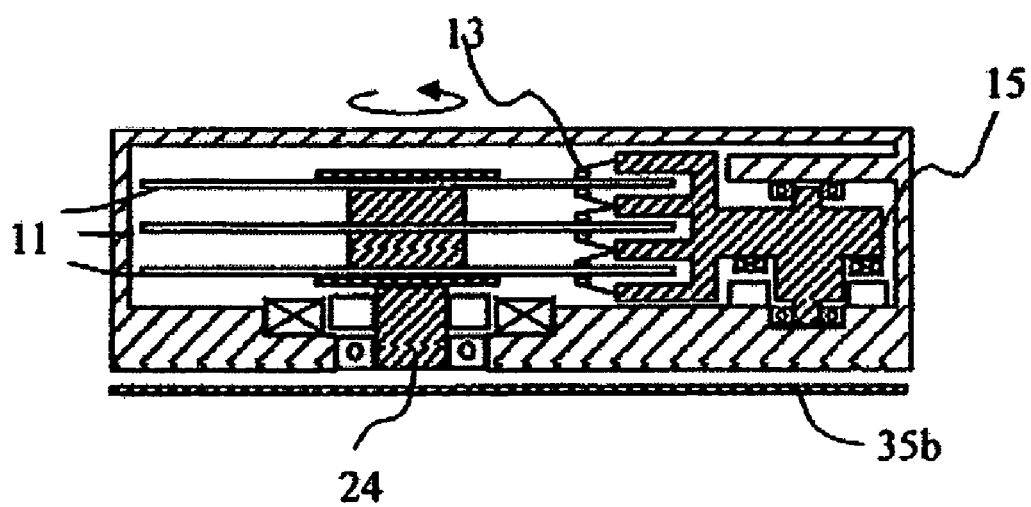

FIGS. 1(a) and 1(b) are conceptual diagrams showing a disk drive according to an embodiment of the present invention. FIG. 1(a) is a top view of the disk drive, and FIG. 1(b) is a side view of the disk drive. A magnetic head mounted on a slider 13 fixed to the tip of a suspension arm 12 writes and reads magnetized signals at a predetermined position on a magnetic disk rotated by a motor 4. It is possible to select a position (track) of the magnetic head on the magnetic disk in a radial direction of the magnetic disk by driving a rotary actuator 15. A write signal to the magnetic head and a read signal from the magnetic head are processed by signal processing circuits 35a and 35b.

Figure 2:
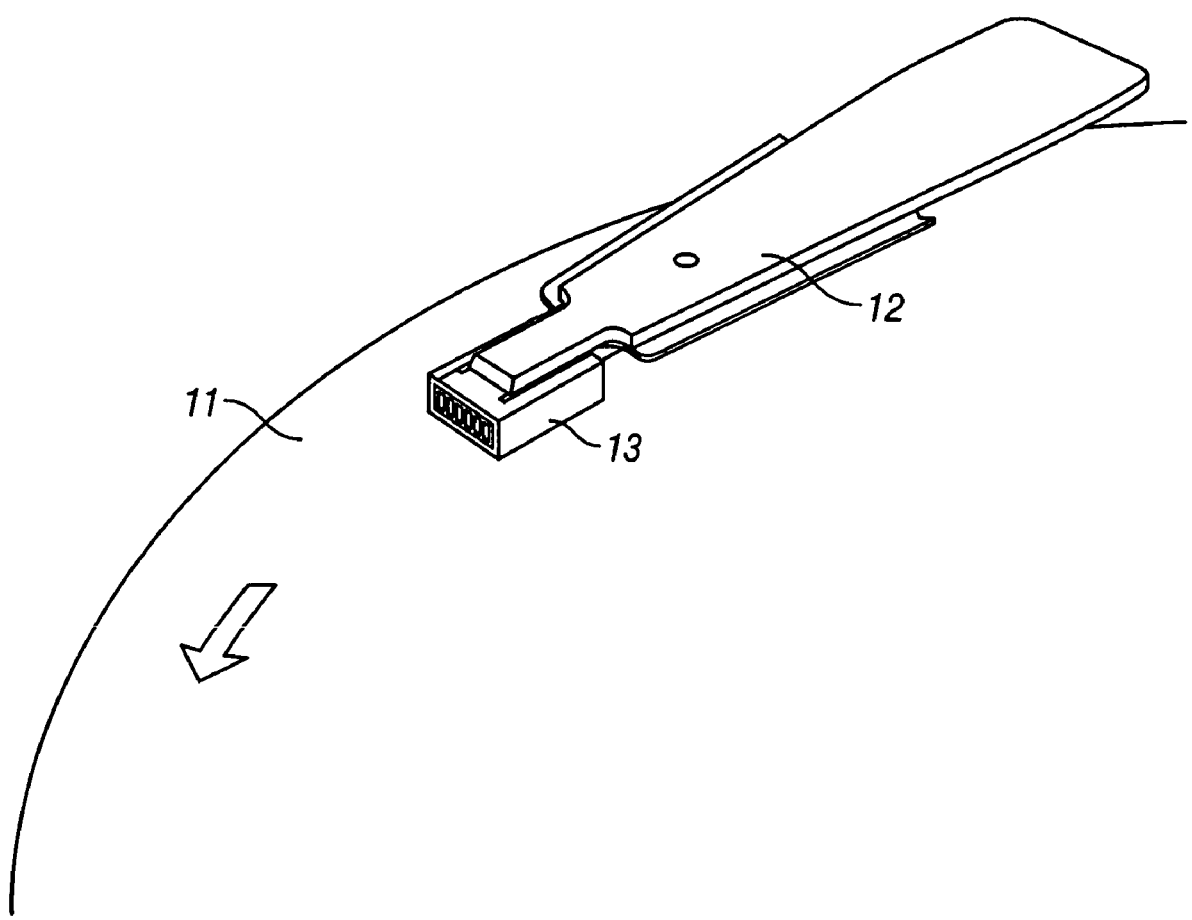
FIG. 2 is an external view of a magnetic head of the present invention.

FIG. 2 shows an external view of a head suspension assembly of the present invention. The head suspension assembly has a suspension arm 12, the slider 13 fixed to the tip of the suspension arm 12, and a read element formed on a trailing edge side of the slider.

Figure 3:
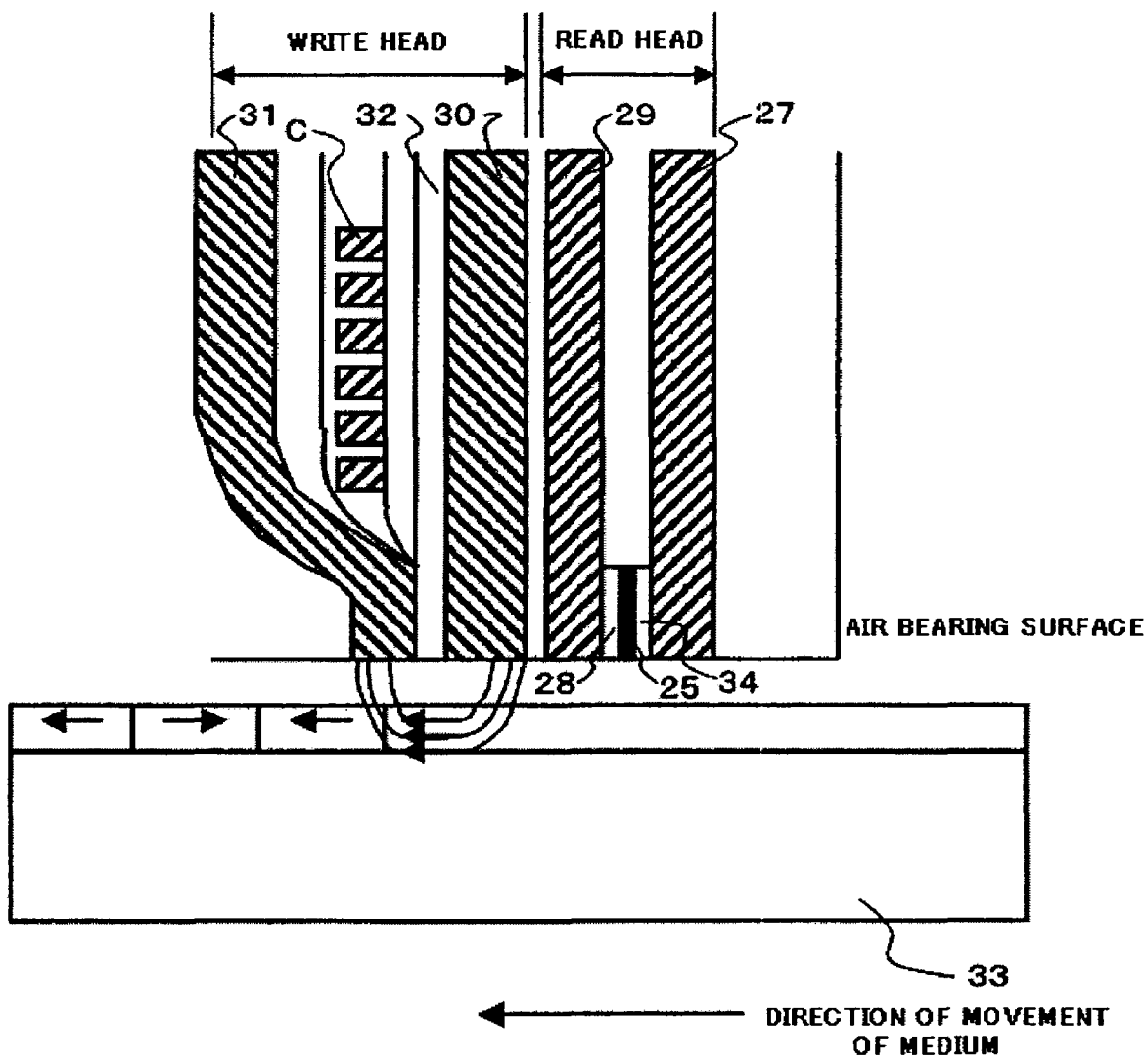
FIG. 3 is a diagram showing a magnetic head of the longitudinal magnetic recording method as viewed from a sectional direction of a magnetic disk.

FIG. 3 is a diagram showing a magnetic head of the longitudinal magnetic recording method as viewed from a sectional direction of a magnetic disk. A read head has a read element 25 disposed on a substrate 34 and sandwiched between an upper magnetic shield 29 and a lower magnetic shield 27. A current is applied to the read element 25 by an electrode. A write head defines a magnetic gap on an air bearing surface facing a magnetic disk 33 by way of a lower pole 30, an upper pole 31, and a magnetic gap layer 32 positioned between the upper and lower poles 31, 32. With the longitudinal recording method, a magnetic flux leaked from the lower pole 30 magnetizes an orbital track on the magnetic medium in the longitudinal direction as shown in FIG. 3 in a writing operation. The read element 25 of the read head injects the magnetic flux into the magnetized region on the rotating magnetic medium to cause a change in resistance inside the read element 25 in a reading operation.

Figure 4:
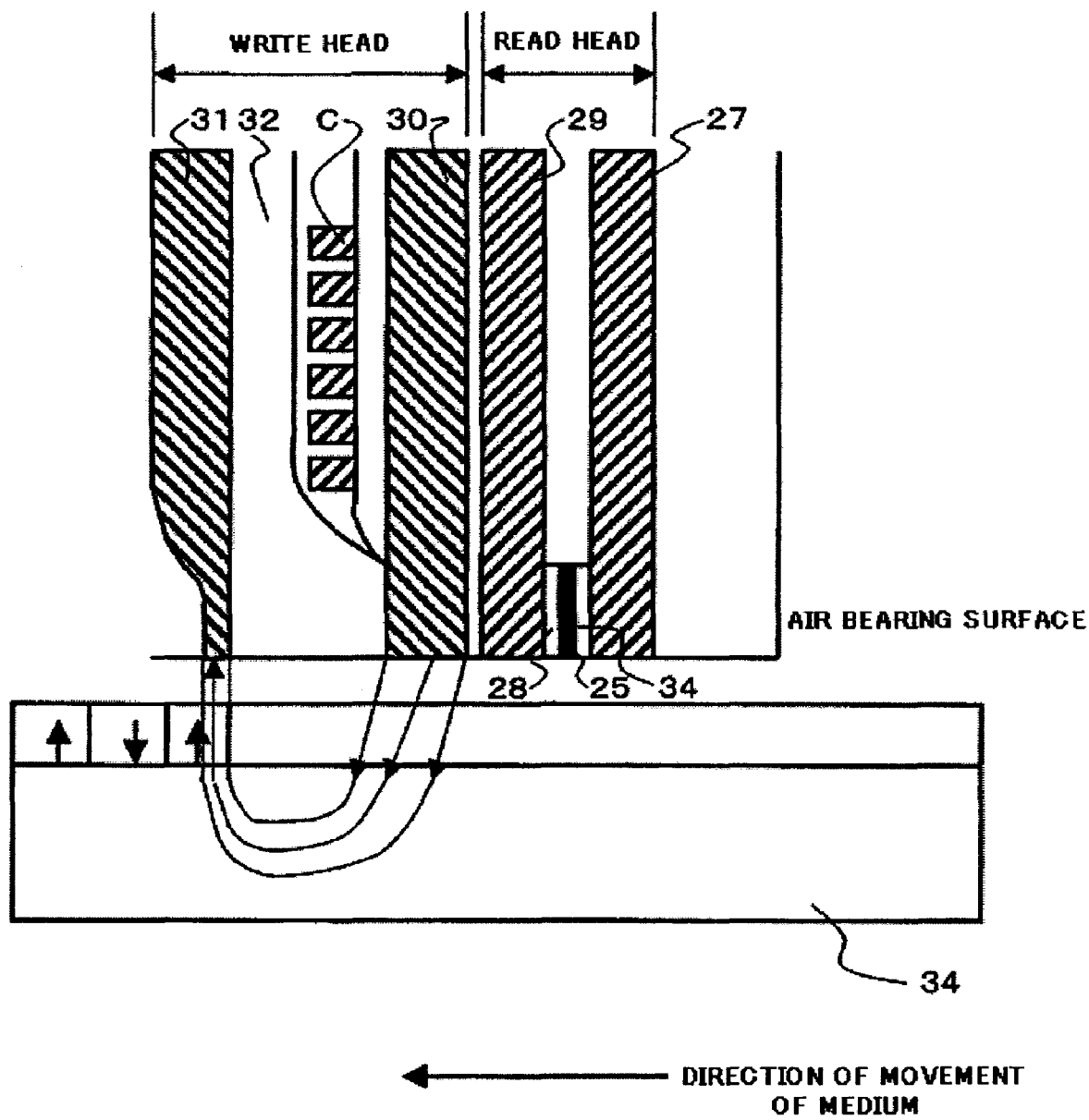
FIG. 4 is a diagram showing a magnetic head of the vertical magnetic recording method as viewed from a sectional direction of a magnetic disk.

Shown in FIG. 4 is a diagram illustrating a magnetic head of the vertical magnetic recording method as viewed from a sectional direction of a magnetic disk. A read head has a read element 25 disposed on a substrate 34 and sandwiched between an upper magnetic shield 29 and a lower magnetic shield 27. A current is applied to the read element 25 by an electrode. A write head defines a magnetic gap on an air bearing surface facing to the magnetic disk 33 by way of a lower pole 30, an upper pole 31, and a magnetic gap layer 32 positioned between the upper and lower poles 31, 32. In a writing operation, a signal current is guided through a coil layer C, and a magnetic flux leaks onto the air bearing surface. The leaked magnetic flux returns to the magnetic head via a lower soft magnetic film 34 of the recording medium. The magnetic flux magnetizes an orbital track on the magnetic medium in the vertical direction. In a reading operation, the read element 25 of the read head injects the magnetic flux into the magnetized region on the rotating magnetic medium to cause a change in resistance inside the read element 25, which is detected as a change in voltage of the read element 25.

Figure 5:
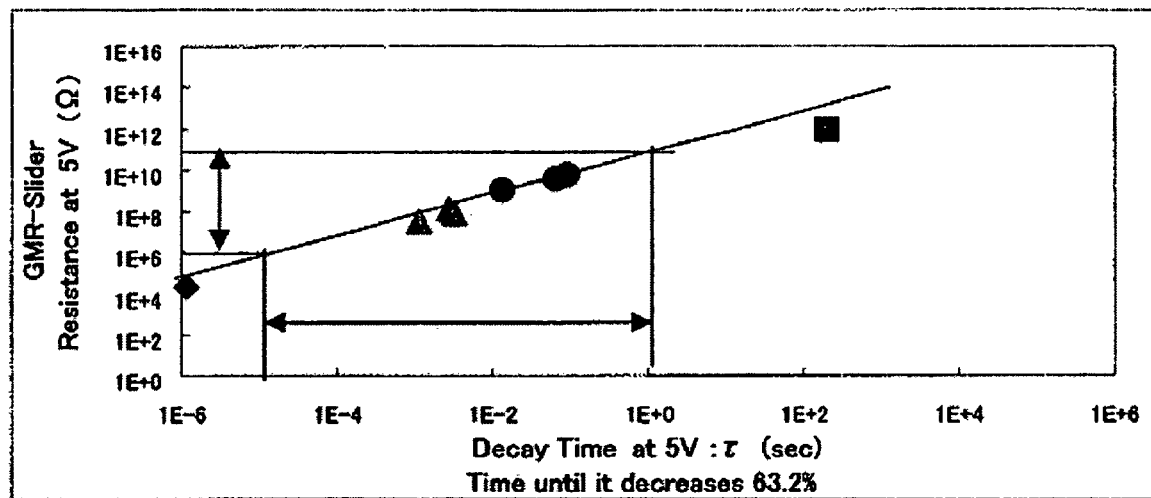
FIG. 5 is a diagram showing a relationship between a time it takes for a charge charged on a read element to diffuse and a resistance value between a read element and a slider.

Shown in FIG. 5 is a relationship between the time it takes for a charge charged on the read element to diffuse and a resistance value between the read element and the slider. As is apparent from FIG. 5, the diffusion time is determined depending on the resistance value. The resistance value between the read element and the slider is a value determined by a resistance value Rr between the electrode and the shield, a resistance value Rl between the shield and the slider, and the resistance value Rc of the protection film on the air bearing surface. When a diffusion constant is small, a large current flows to the read element to damage the read element. In turn, when a diffusion constant is large, the charge is retained for a long period of time to cause static electricity destruction during assembling. Therefore, the resistance between the electrode of the read element and the slider may preferably be in the range of about $10^6$ Ω to $10^{11}$ Ω.

Figure 6:
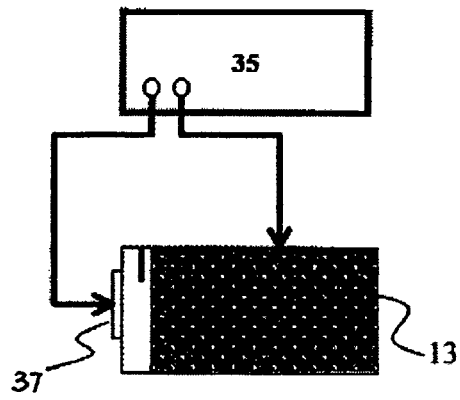
FIG. 6 is a diagram showing a method for measuring the resistance value of FIG. 5.

FIG. 6 shows a method for measuring the resistance value of FIG. 5. A resistance value between a read element terminal 37 and the slider 13 is measured by a high resistance meter.

Figure 7:
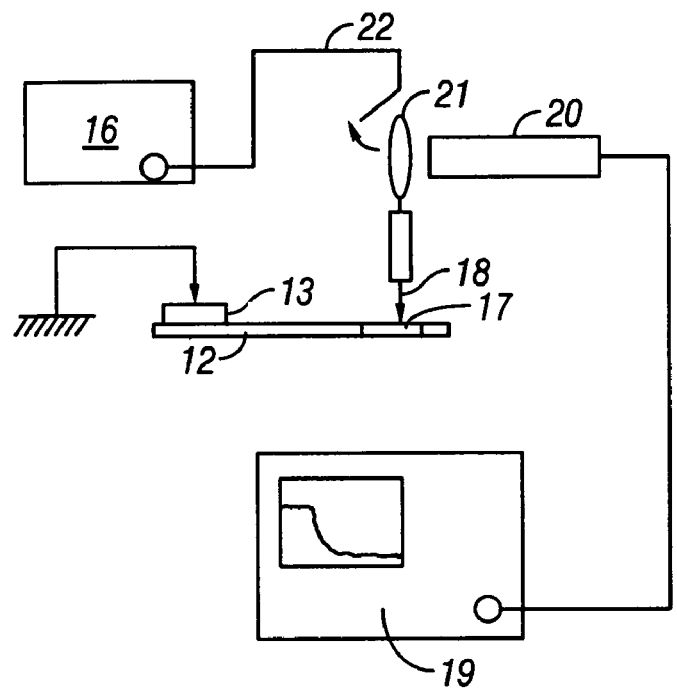
FIG. 7 is a diagram showing a method for measuring the diffusion time of FIG. 5.

FIG. 7 shows a method for measuring the diffusion time in FIG. 5. A surface of the slider 13 is grounded to be charged by a power unit 16 (through a wire 22, a plate 21, and a contact probe 18) via a lead terminal 17 of the suspension 12, and then a damping time is measured by a potential meter 20 and displayed on a digital oscilloscope 19.

Figure 12:
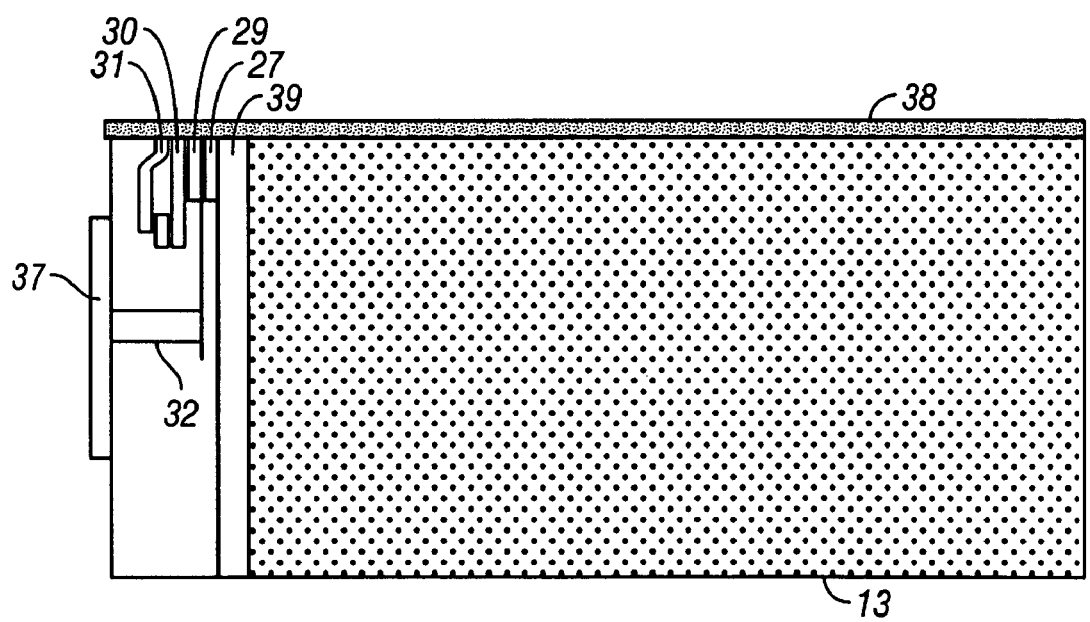
FIG. 12 is a magnetic head according to a first embodiment of the present invention.

FIG. 12 shows a magnetic head according to a first embodiment of the present invention. In this embodiment, a 1 nm-thick Si underlayer is formed and then a 2 nm-thick CAC carbon film is formed on the Si underlayer to obtain an ABS protection film 38. Further, a 0.7 nm-thick base alumina is formed, and a 3-μm thick lower magnetic shield 27 is formed. With the above constitution, a resistance value between a slider 13 and a read element terminal 37 becomes $10^{10}$ Ω, wherein a diffusion time becomes 10 ms.

Figure 13:
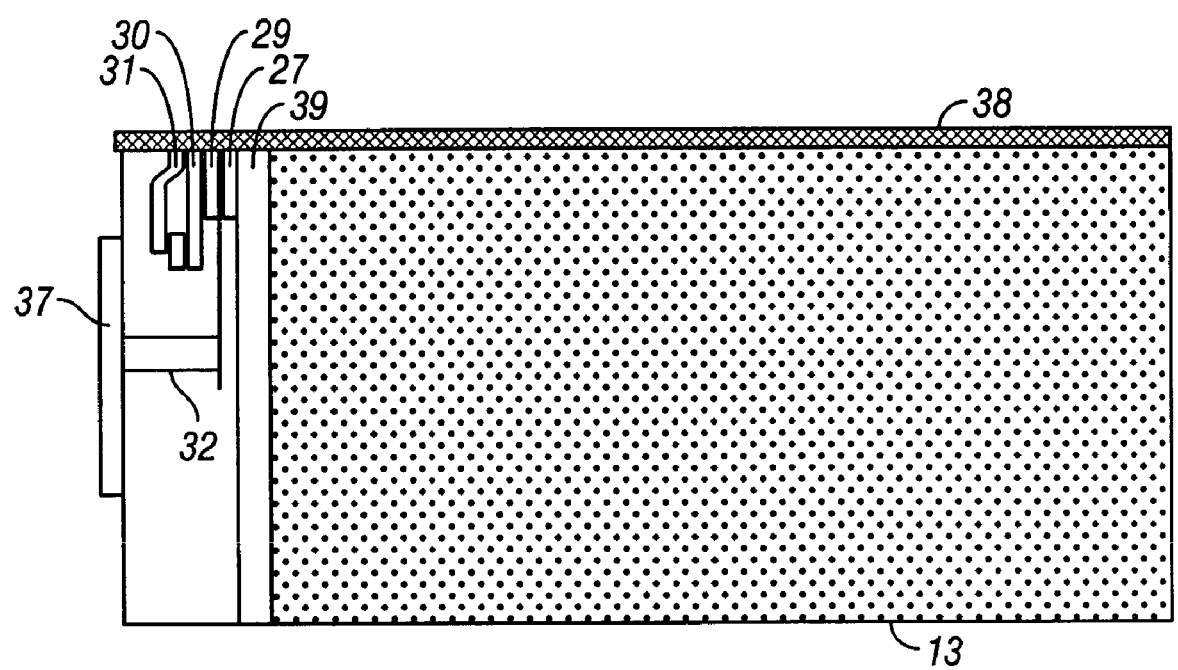
FIG. 13 is a magnetic head according to a second embodiment of the present invention.

FIG. 13 shows a magnetic head according to a second embodiment of the present invention. In this embodiment, a dense film is formed under decreased gas pressure by changing a sputtering rate for a CAC carbon from $10^{-4}$ Torr to $10^{-5}$ Torr. A 1 nm-thick Si underlayer is formed and then a 2 nm-thick CAC carbon film is formed on the Si underlayer to obtain an ABS protection film 38. Further, a 0.7 nm-thick base alumina is formed, and a 3 μm-thick lower magnetic shield 27 is formed. With the above constitution, a resistance value between a slider 13 and a read element terminal 37 becomes $10^8$ Ω, wherein a diffusion time becomes 1 ms.

Figure 8:
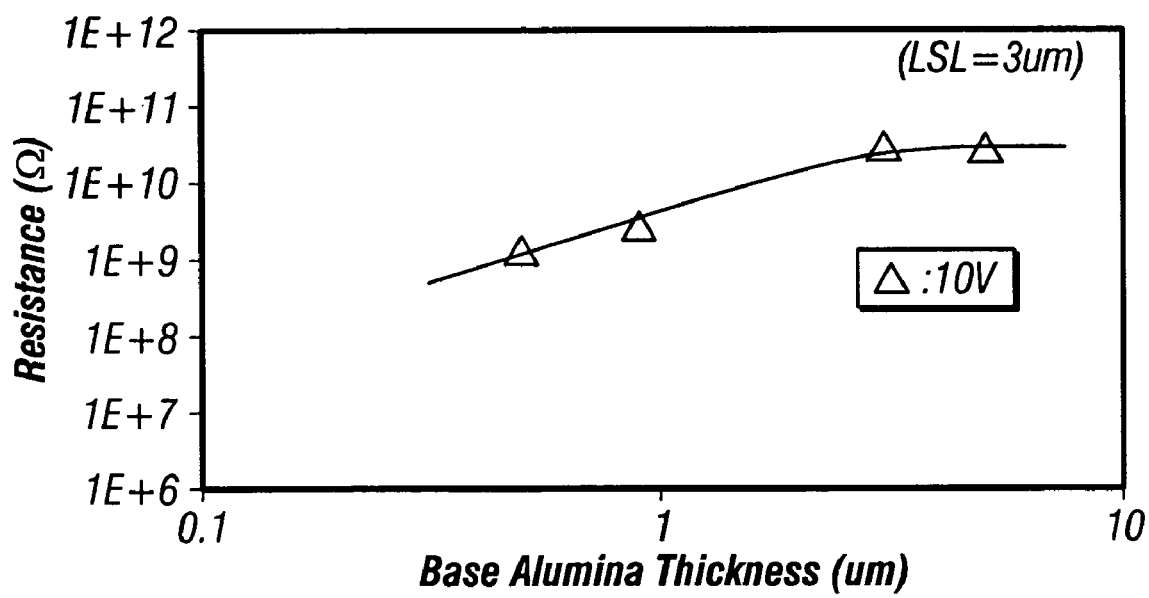
FIG. 8 is a diagram showing a relationship between a base alumina film thickness and the resistance value.

FIG. 8 is a diagram showing a relationship between the base alumina film thickness and the resistance value. As is apparent from FIG. 8, it is possible to reduce the resistance value when the base alumina 39 of the magnetic heads shown in FIGS. 12 and 13 is decreased in thickness.

Figure 9:
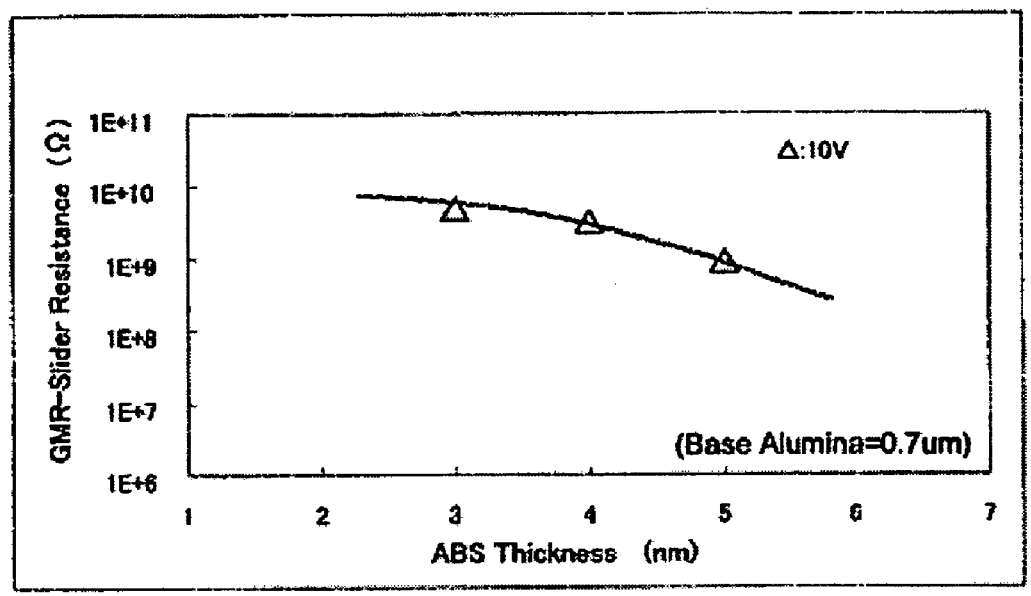
FIG. 9 is a diagram showing a relationship between a protection film thickness and the resistance value.

FIG. 9 is a diagram showing a relationship between the protection film thickness and the resistance value. As is apparent from FIG. 9, it is possible to reduce the resistance value when the protection film 32 of the magnetic heads shown in FIGS. 12 and 13 is decreased in thickness.

Figure 10:
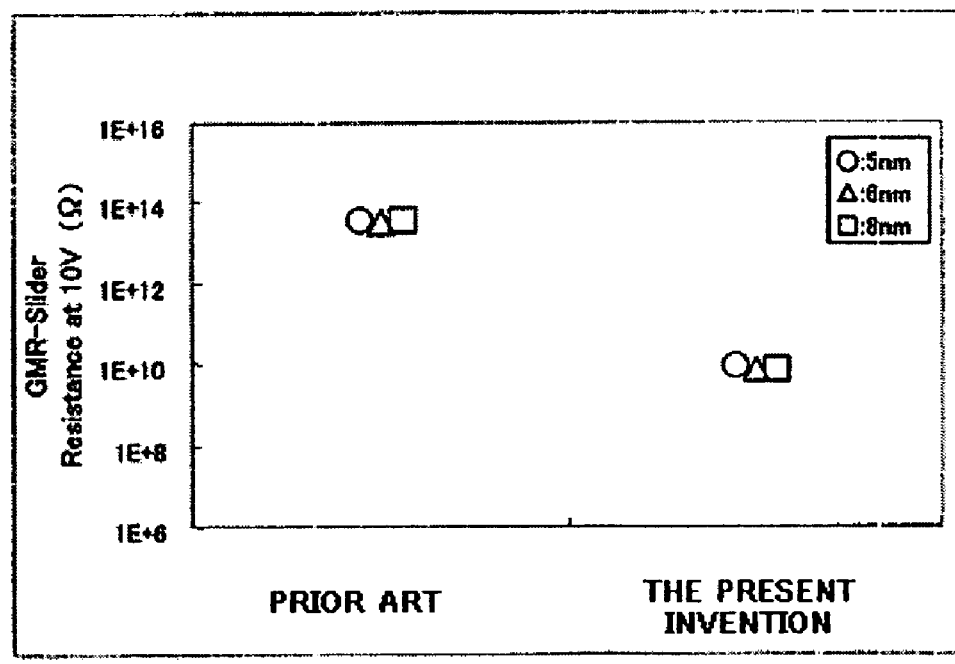
FIG. 10 is a diagram showing a relationship between a method for forming a protection film and the resistance value.

FIG. 10 shows a dependency on the method for forming the protection film. As is apparent from FIG. 10, the CAC carbon used in the present invention reduces the resistance value relative to a conventional CVD carbon.

Figure 11:
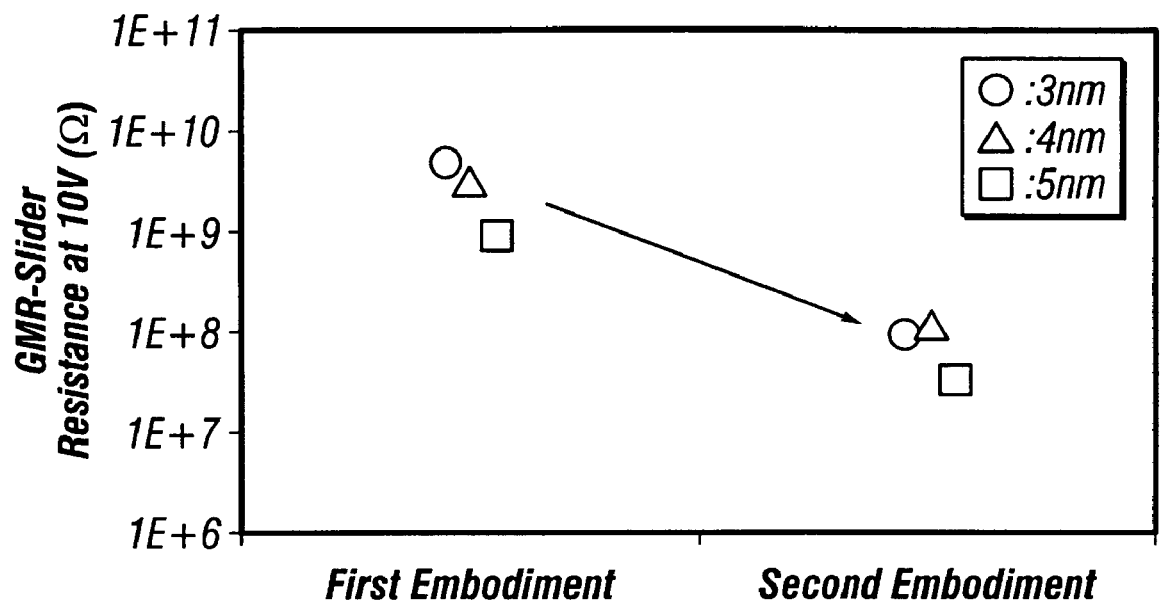
FIG. 11 is a diagram showing a relation ship between protection film processing and the resistance value.

FIG. 11 is a diagram showing a relationship between protection film processing and the resistance value. As is apparent from FIG. 11, the resistance value is reduced by using about 10% of nitride in the CAC carbon method as in the second embodiment.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic head comprising:
    a slider;
    a base alumina formed on the slider;
    a lower magnetic shield formed on the base alumina;
    a read element formed on the lower magnetic shield;
    an electrode for applying a current to the read element;
    an upper magnetic shield formed on the electrode; and
    a protection film formed on an air bearing surface;
    wherein a charge diffuses from the read element to the slider at a time constant between about 100 ms and 1 ms.

2. The magnetic head according to claim 1, wherein the protection film contains carbon.

3. The head suspension assembly according to claim 1, wherein a resistance between the electrode and the suspension is in the range of about $10^6$ Ω to $10^{11}$ Ω, and wherein the protection film is between about 3 nm and about 8 nm.

4. The magnetic head according to claim 1, wherein the resistance value between the read element and the slider is determined depending on a resistance value Rr between the electrode and the upper and lower magnetic shields, a resistance value Rl between the upper and lower magnetic shields and the slider, and a resistance value Rc of the protection film on the air bearing surface.

5. The magnetic head according to claim 1, wherein the base alumina has a film thickness of about 0.7 micrometers.

6. The magnetic head according to claim 1, wherein the protection film comprises a 1 nm-thick Si underlayer and a 2 nm-thick CAC carbon film.

7. The magnetic head according to claim 1, wherein the lower magnetic shield has a thickness of about 3 μm.

8. A head suspension assembly comprising:
   a read element for reading information from a magnetic disk;
   an electrode for applying a current to the read element;
   a slider having the read element and the electrode; and
   a suspension for supporting the slider;
   wherein a charge diffuses from the read element to the suspension at a time constant between about 100 ms and 1 ms.

9. The head suspension assembly according to claim 8, further comprising a protection film formed on an air bearing surface, wherein a resistance between the electrode and the suspension is in the range of about $10^6$ Ω to $10^{11}$ Ω, and wherein the protection film is between about 3 nm and about 8 nm.

10. The head suspension assembly according to claim 8, wherein
    the suspension has a wiring connected to an electric ground, and
    a resistance between the electrode and the ground wiring is in the range of about $10^6$ Ω to $10^{11}$ Ω.

11. The head suspension assembly according to claim 8, further comprising:
    a base alumina formed on the slider;
    a lower magnetic shield formed on the base alumina, wherein the read element is formed on the lower magnetic shield;
    an upper magnetic shield formed on the electrode; and
    a protection film formed on an air bearing surface.

12. The head suspension assembly according to claim 11, wherein the protection film contains carbon.

13. The head suspension assembly according to claim 11, wherein the base alumina has a film thickness of about 0.7 micrometers.

14. The head suspension assembly according to claim 11, wherein the protection film comprises a 1 nm-thick Si underlayer and a 2 nm-thick CAC carbon film.

15. The head suspension assembly according to claim 11, wherein the lower magnetic shield has a thickness of about 3 μm.

* * * * *